March 7, 1950      G. RAYMOND      2,499,527
VALVE
Filed March 4, 1946      2 Sheets—Sheet 1
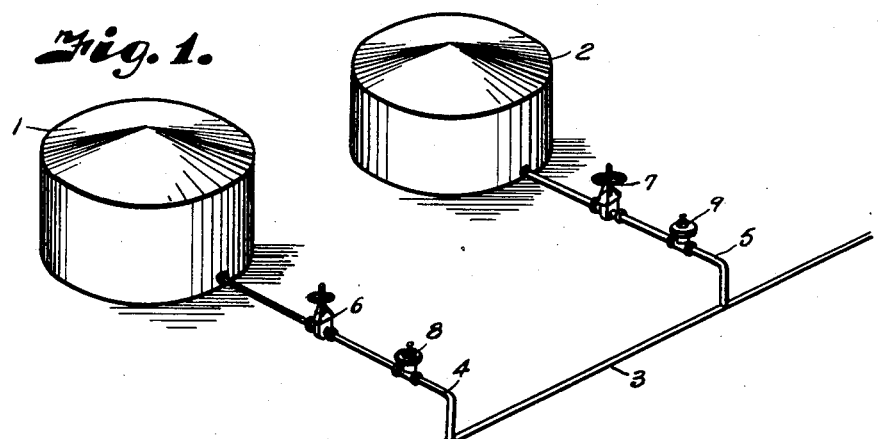
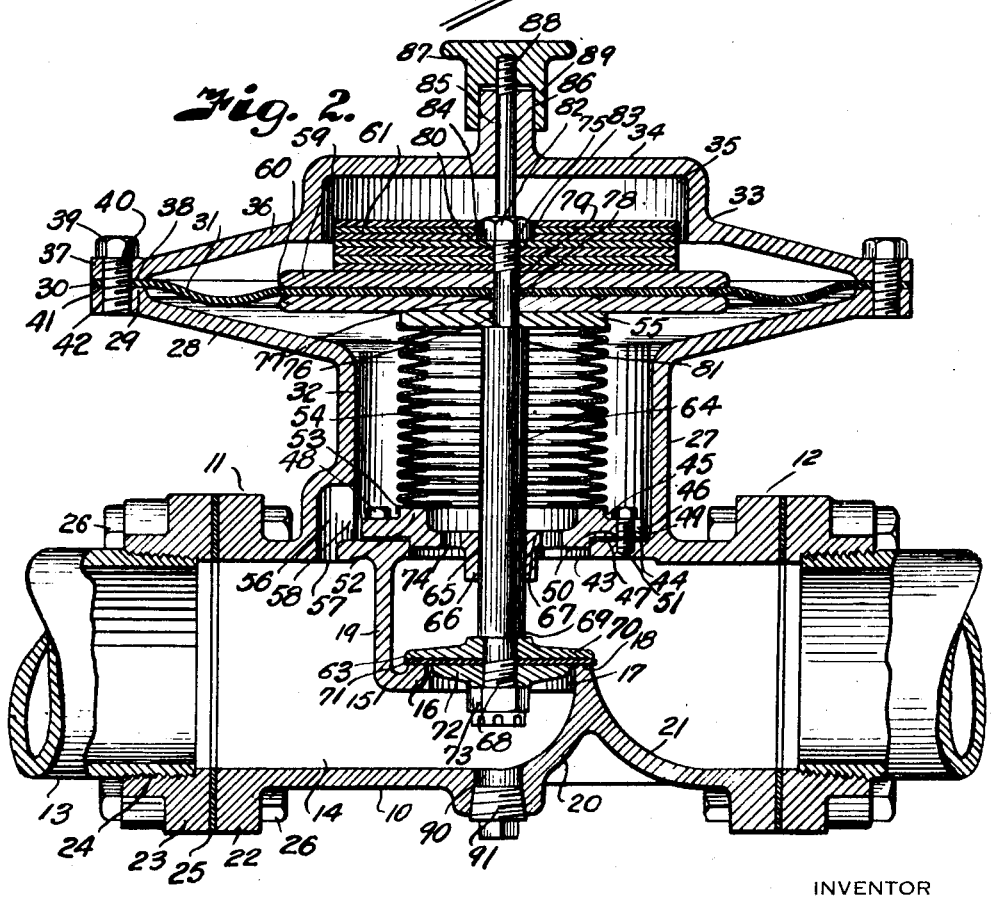
INVENTOR
GWYNNE RAYMOND
BY Fishburn & Mullendore
ATTORNEYS March 7, 1950  G. RAYMOND  2,499,527
VALVE
Filed March 4, 1946  2 Sheets-Sheet 2
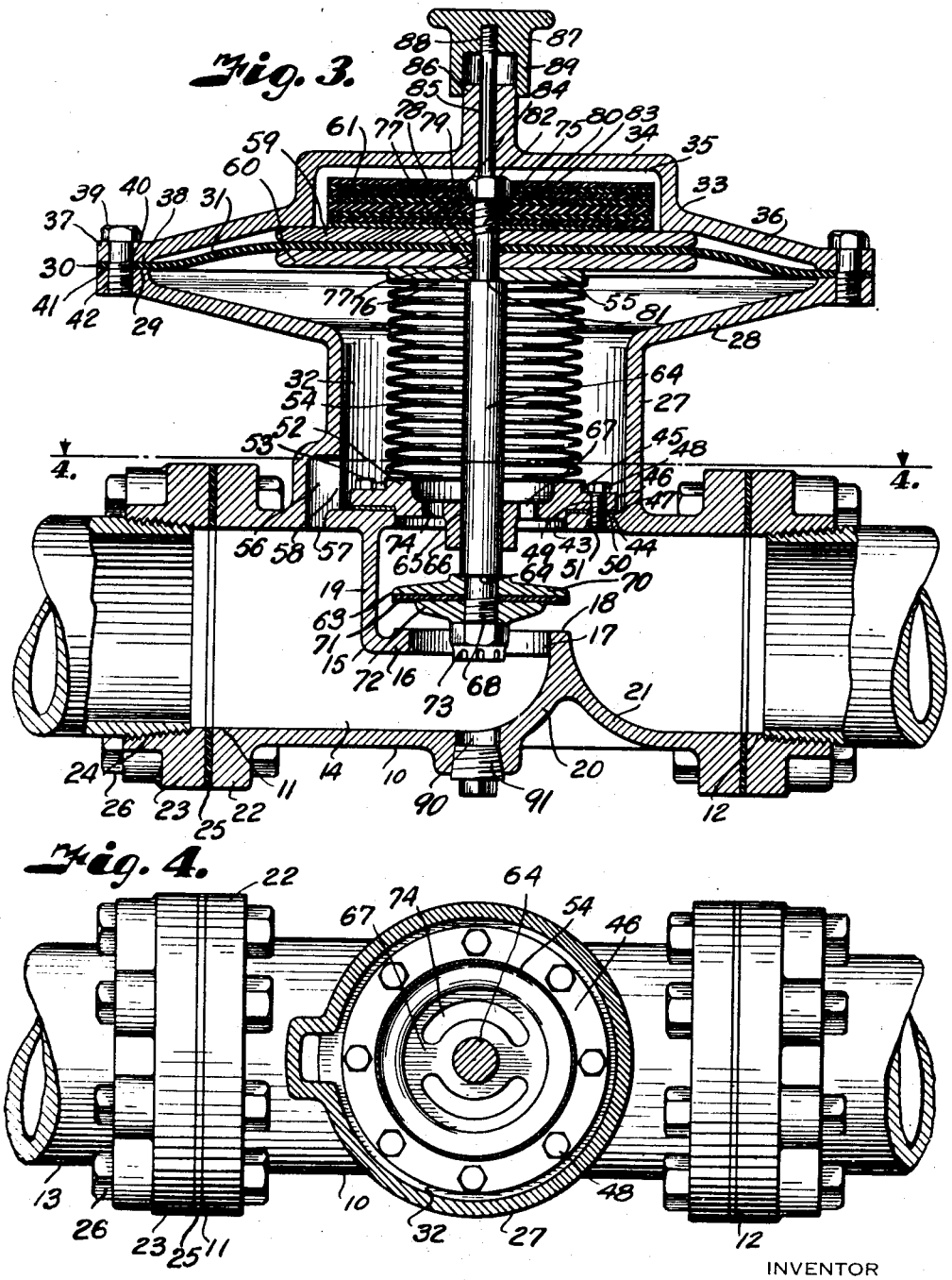
INVENTOR
GWYNNE RAYMOND
BY
Fishburn & Mullendore
ATTORNEYS Patented Mar. 7, 1950

2,499,527

UNITED STATES PATENT OFFICE 2,499,527

VALVE

Gwynne Raymond, Oklahoma City, Okla., assignor to Black, Sivalls & Bryson, Inc., Kansas City, Mo., a corporation of Delaware Application March 4, 1946, Serial No. 651,753

3 Claims. (Cl. 137—53)

This invention relates to valves for automatically controlling the flow from individual tanks in a battery serving a pipe line gathering system when the respective tanks empty, thereby eliminating air from the pipe line system.

The principal object of the invention is to provide a valve of this character that is automatic in operation, simple and inexpensive in construction, and positive in operation.

In accomplishing these and other objects of the invention hereinafter pointed out, I have provided improved structure, the preferred form of which is shown in the accompanying drawings wherein:

Fig. 1 illustrates a battery of tanks serving a pipe line system and equipped with valves embodying the features of the present invention.

Fig. 2 is an enlarged vertical section through one of the valves showing the valving member in seated position as when the hydrostatic head in the tank to which the valve is connected has been lowered to a predetermined head.

Fig. 3 is a similar section showing the valve in open position to allow flow from the tank into the flow line of the gathering system.

Fig. 4 is a horizontal section on the line 4—4 of Fig. 3.

Referring more in detail to the drawings:

1 and 2 designate a battery of storage tanks for containing oil or other fluid to be delivered to a pipe line gathering system that is indicated at 3, the tanks being connected with the pipe 3 by branch pipes 4 and 5 equipped with positive shut off valves 6 and 7 and automatic valves 8 and 9 embodying the features of the present invention. Each of the automatic valves includes a valve body 10 having inlet and outlet connections 11 and 12 with the adjacent sections of pipe 13 in which it is installed. Extending through the body from the inlet to the outlet connections is a flow passageway 14 closed by a transverse partition 15 having a horizontal portion 16 located substantially in the horizontal center of the flow passageway and which is provided with a port 17 that is encircled by a valve seat 18 located on the outlet side thereof. A portion 19 of the partition above the valve seat on the inlet side of the port may be relatively straight but the portion 20 of the partition on the opposite side of the port is preferably curved to facilitate diversion of liquid to the port when the valve is under flow as later described. The curved portion 20 may be joined by an oppositely curved portion 21 to facilitate outlet of liquid through the flow connection of the valve. The inlet and outlet connections may be made with the respective pipe sections in any suitable manner, but they are here shown as comprising flanges 22 formed on the valve body and cooperating with flanges 23 that are threaded onto the pipe sections as indicated at 24. A suitable gasket 25 is inserted between the face sides of the flanges and the flanges are drawn together into contact with the gasket by fastening devices such as bolts 26.

Formed on the valve body coaxially with the port 16 is a collar 27 preferably of cylindrical form and which may be constructed integral with the valve body. The upper portion of the collar terminates in an outwardly and slightly upwardly extending flange 28 having an annular face 29 seating the marginal edge 30 of a flexible diaphragm 31 that closes the top of a bellows chamber 32 within the collar. The diaphragm is retained in position by a cap 33 including a central portion 34 having a cylindrical recess 35 on the diaphragm side of slightly larger diameter than the inner diameter of the collar portion of the valve. Extending outwardly and downwardly from the portion 33 of the cap is a flange 36 terminating in a rim 37 having an annular face 38 cooperating with the face 29 to clamp the marginal edge of the diaphragm therebetween when fastening devices such as cap screws 39 are passed through openings 40 in the cap, registering openings 41 in the diaphragm and into threaded socket 42 of the rim of the flange 28. Formed in the valve body substantially concentric with the port 17 is an opening 43 of a diameter to leave a circumferential ledge 44 for seating a bellows head 45. The head 45 includes an annular flange 46 which is clamped against a gasket 47 which is seated on the ledge, the flange being secured by fastening devices such as cap screws 48 extending through openings 49 in the flange, openings 50 in the gasket, and into threaded sockets 51 of the valve body. Extending upwardly from the flange is an annular rib 52 to which is secured by solder or otherwise secured, an end flange 53 of a bellows 54. The opposite end of the bellows 54 is closed by a head 55 that is sealed thereto by solder or the like so that the interior of the bellows is completely sealed from the space therearound, which space is in communication with the inlet side of the valve through a duct 56 having an inlet 57 opening from the inlet side of the valve and an outlet 58 opening laterally through the wall of the collar as shown in Fig. 2.

In order to reinforce the center of the diaphragm, the upper and lower sides thereof are engaged by disks 59 and 60, the upper disk 59 carrying a plurality of disk-like weights 61 contained within the recess 35 of the cap.

63 designates a valving member for closing the port 17, and 64 designates the stem therefor. The stem 64 comprises a rod slidable in the axial bore 65 of a hub 66 carried on a spider 67 formed integrally with the lower head of the bellows. The lower end of the rod has a reduced terminal 68 to form a shoulder 69 to seat the disk-like body 70 of the valving member and which carries facing material 71 adapted to engage the seat 18. The facing material is retained in contact with the valve member 63 by a washer 72 of smaller diameter than the port 17 so that it is movable therethrough and which is backed by a nut 73 threaded on a projecting portion of the terminal 68 of the valve stem. The effective area of the upper surface of the valving member is substantially the effective area of the upper bellows head 55 so that the pressure acting on the upper head within the bellows through ports 74 of the spider equalizes the pressure acting on the upper surface of the valving member, which pressures are the pressures contained in the outlet side of the valve. Thus, the pressure on the outlet side of the valve has nothing to do with opening or closing thereof so that it is not effected by vacuum pressures as liquid is pumped out of the valve upon closing of the valving member.

The upper end of the valve stem projects through the bellows and has a reduced upper terminal 75 extending through registering openings 76 in the head of the bellows, registering openings 77, 78, 79 and 80 in the backing plate 60, diaphragm 31, backing plate 59 and weights 61, respectively. The reduced terminal forms an annular shoulder 81 against which the head of the bellows seats so that when a nut 82 is applied to a threaded portion 83 of the reduced terminal, the parts are drawn together to form a fluid-tight connection. If a number of weight disks are required, the upper disk may be provided with larger center openings 84 so that they accommodate the nut therein. The upper end of the terminal extends through the axial bore 85 of a boss 85 that is provided on the cap closing the diaphragm chamber. A knob 87 is preferably threaded on the end of the terminal as indicated at 88 and has a depending annular skirt 89 slidable over the periphery of the boss.

The effective portion of the diaphragm exposed to the pressure on the inlet side of the valve is such that the static head in the tank is sufficient to cause the diaphragm to raise the valving member from its seat and allow for flow through the valve. The amount of static head required to unseat the valve may be controlled by adding or subtracting from the weight disks carried on the top of the diaphragm.

The body of the valve may have a drain port 90 below the valve port 17 and which is normally closed by a threaded plug 91.

Assuming that a valve constructed and assembled as described is connected in the branch line 4 and the tank 1 is filled with liquid to be delivered to the line 3 under suction of a pump that delivers the liquid into a main flow line under pressure to effect the desired flow therethrough and with the valve 6 open, the hydrostatic pressure in the tank acts through the inlet connection of the valve ports 57 and 58 and through the space surrounding the bellows onto the underside of the diaphragm for automatically unseating the valving member and allow for flow from the tank through the valve port to the outlet connection and from the outlet connection to the line 3.

In order that the valve may be automatically closed when the hydrostatic pressure in the tank has reached a predetermined low value, the required number of weights 61 are applied on plate 59 that is carried by the upper face of the diaphragm 31 to act against the fluid pressure on the underside so that when the fluid pressure is reduced to the predetermined amount by reason of the flow through the valve, the weights 61 act to seat the valving member 63 and shut off the flow to leave sufficient oil in the inlet side to form an oil seal in the valve. As the suction occurs on the outlet side, it acts with substantially equal force on the under face of the upper head 55 of the bellows 54 and on the upper face of the valve member so that it has no effect on the opening or closing movement and the valve remains closed by reason of the weights on the upper side of the diaphragm.

From the foregoing it is obvious that I have provided an automatic valve operable responsive to hydrostatic head or fluid pressure on the inlet side of the valve and which is not affected by suction pressures on the downstream side of the valve. It is also obvious that I have provided a valve that is of simple and inexpensive construction and positive in operation.

What I claim and desire to secure by Letters Patent is:

1. A valve of the character described including a valve body having a flow passageway between inlet and outlet connections on said body, a partition extending across the flow passageway to separate the flow passageway into an inlet chamber and an outlet chamber and said partition being provided with a port having an encircling seat in the direction of the outlet chamber, means on the valve body forming a chamber adapted to contain a bellows and having a flow connection with the inlet chamber, means separating the outlet chamber from said bellows chamber and having a valve stem guide coaxial with said seat, means forming a chamber in connection with said bellows chamber adapted to contain a diaphragm, a diaphragm in said diaphragm chamber and subject to pressure in the inlet chamber through said flow connection, a bellows in said bellows chamber having a head sealed with respect to the diaphragm and having a head sealed with respect to the valve body for cooperation with the bellows in separating the outlet chamber from the inlet chamber, whereby the bellows confines the inlet pressure on the diaphragm circumferentially of the bellows and the first named head of the bellows is subjected to pressure in the outlet chamber through a port in the second named head of the bellows, a valve in the outlet chamber adapted to engage said seat, a stem for the valve passing through said guide and having connection with the diaphragm, and loading means on the side of the diaphragm opposite the bellows.

2. A valve of the character described including a valve body having a flow passageway between inlet and outlet connections on said body, a partition extending across the flow passageway to separate the flow passageway into an inlet chamber and an outlet chamber, said partition being provided with a port having an encircling seat on the side of the outlet chamber, means on the valve body forming a chamber adapted to contain a bellows and having a flow connection with the inlet chamber and provided with an annular ledge coaxial with said seat, means forming a chamber in connection with said bellows chamber adapted to contain a diaphragm, a diaphragm in said diaphragm chamber and subject to pressure in the inlet chamber through said flow connection, a bellows in the bellows chamber having a head sealed with respect to the diaphragm and having a head seated on said ledge whereby the bellows confines the inlet pressure to the diaphragm circumferentially of the bellows, said last named head having a guide coaxial with the valve seat and having a port connecting the interior of the bellows with the outlet chamber to subject the first named head of the bellows to pressure in the outlet chamber, fastening devices removably securing the second named head to said ledge, a valve in the outlet chamber adapted to engage said seat, a stem for the valve passing through said guide and having connection with the diaphragm, and loading means on the side of the diaphragm opposite the bellows.

3. A valve of the character described including a valve body having a flow passageway between inlet and outlet connections on said body, a partition extending across the flow passageway to separate the flow passageway into an inlet chamber and an outlet chamber and said partition being provided with a port having an encircling seat in the direction of the outlet chamber, means on the valve body forming a chamber adapted to contain a bellows and having a flow connection with the inlet chamber, means separating said outlet chamber from the bellows chamber and having a valve stem guide coaxial with said seat, means forming a diaphragm chamber in connection with the bellows chamber adapted to contain a diaphragm, a diaphragm in said diaphragm chamber and subject to pressure in the inlet chamber through said flow connection, a bellows in said bellows chamber having a head sealed with respect to the diaphragm and having a head sealed with respect to the valve body for cooperating with the bellows in separating the outlet chamber from the inlet chamber, whereby the bellows confines the inlet pressure to the diaphragm circumferentially of the bellows and the first named head of the bellows is subjected to pressure in the outlet chamber through a port in the second named head of the bellows, a valve in the outlet chamber adapted to engage said seat, a stem for the valve passing through said guide and having connection with the diaphragm, loading means on the side of the diaphragm opposite the bellows, said stem having an extension projecting from the diaphragm chamber, and a means on said stem for indicating position of the valve.

GWYNNE RAYMOND.

REFERENCES CITED

The following references are of record in the file of this patent:

UNITED STATES PATENTS

| Number | Name | Date |
|---|---|---|
| 361,908 | Stott | Apr. 26, 1887 |
| 1,153,681 | Fulton | Sept. 14, 1915 |
| 1,268,597 | Montreuil | June 4, 1918 |
| 1,470,057 | Carter | Oct. 9, 1923 |
| 1,676,889 | Davis | July 10, 1928 |
| 1,701,870 | Conrader | Feb. 12, 1929 |
| 1,733,528 | Davis | Oct. 29, 1929 |
| 1,820,358 | MacLean | Aug. 25, 1931 |
| 2,327,055 | McMahon | Aug. 17, 1943 |

FOREIGN PATENTS

| Number | Country | Date |
|---|---|---|
| 189,999 | Germany | Aug. 17, 1907 |